(12) United States Patent
Smith, III

(10) Patent No.: US 6,227,245 B1
(45) Date of Patent: May 8, 2001

(54) UNDERSEA HYDRAULIC COUPLING WITH INTERNAL GUARD FOR FLOW PORT

(75) Inventor: Robert E. Smith, III, Missouri City, TX (US)

(73) Assignee: National Coupling Company Inc., Stafford, TX (US)

( * ) Notice: Subject to any disclaimer, the term of this patent is extended or adjusted under 35 U.S.C. 154(b) by 0 days.

(21) Appl. No.: 09/676,264

(22) Filed: Sep. 28, 2000

(51) Int. Cl.[7] .................................................. F16L 37/28
(52) U.S. Cl. ............................ 137/625.28; 137/614.04; 251/149.7
(58) Field of Search ..................... 137/614.04, 614.03, 137/614.01, 614, 625.28; 251/149.7

(56) References Cited

U.S. PATENT DOCUMENTS

| | | | | |
|---|---|---|---|---|
| 4,637,470 | * | 1/1987 | Weathers et al. | 137/614.04 X |
| 6,085,785 | * | 7/2000 | Smith, III | 137/614 X |
| 6,095,191 | * | 8/2000 | Smith, III | 137/614.04 |

* cited by examiner

Primary Examiner—Kevin Lee
(74) Attorney, Agent, or Firm—Fulbright & Jaworski

(57) ABSTRACT

An undersea hydraulic coupling member is disclosed having angled flow ports to prevent ingress of debris into the hydraulic lines. A port guard attached to the valve actuator closes the flow ports unless the poppet valve is opened by mutual engagement with the opposing coupling member.

13 Claims, 3 Drawing Sheets

UNDERSEA HYDRAULIC COUPLING WITH INTERNAL GUARD FOR FLOW PORT

BACKGROUND OF THE INVENTION

1. Field of the Invention

This invention relates in general to hydraulic couplings, and specifically to hydraulic couplings used in undersea drilling and production applications. More particularly, this invention involves a hydraulic coupling member having angled flow ports to prevent ingress of debris and an internal guard to close the flow ports when the valve in the coupling member is closed.

2. Description of Related Art

Subsea hydraulic couplings are old in the art. The couplings generally consist of a male member and a female member with sealed fluid passageways connecting therebetween. The female member generally is a cylindrical body with a relatively large diameter longitudinal bore at one end and a relatively small diameter longitudinal bore at the other. The small bore facilitates connections to hydraulic lines, while the large bore seals and slidingly engages the male member of the coupling. The male member includes a cylindrical portion at one end having an outer diameter approximately equal to the diameter of the large bore of the female member of the coupling. The male member also includes a connection at its other end to facilitate connection to hydraulic lines. When the cylindrical portion of the male member is inserted into the large bore of the female member, according to various embodiments of the device, fluid flow is established between the male and female members. Couplings of this type are shown in U.S. Pat. No. 4,694,859 to Robert E. Smith, III and other patents owned by National Coupling Company, Inc. of Stafford, Tex.

In undersea drilling and production applications, the male member of the coupling may be connected to a manifold plate or other securement at a subsea location at the inside or outside of a well bore. In many cases, the male members are positioned so that the end or leading face of each member points vertically up from the sea floor. The female members, which also may be secured to a manifold plate, are moved into position over the male members and then lowered onto the male members by a diver or subsea vehicle. When the female members are positioned on the male members, hydraulic fluid typically is from the female member to the male member of each coupling. In some cases, only the female member of the coupling has a poppet valve.

The poppet valve typically includes a conical valve face which seats, in the closed position, against a valve seat in the coupling member. The poppet valve opens to allow fluid flow, and closes against the valve seat within the bore to arrest the flow. Generally, the poppet valve is spring-biased to the closed position. The valve may include a valve actuator which may be a nose or stem extending from the apex of the valve face along the longitudinal axis of the poppet valve.

Frequently, well bores in which the couplings are positioned are full of debris. The male member, which remains subsea when the coupling is disconnected, is subject to debris accumulating in flow passages. The flow passages in the male member may be directly across the gap between the valve face and the valve seat, as shown in U.S. Pat. No. 4,694,859. Or as shown in U.S. Pat. Nos. 4,754,780, 5,099,882, and 4,832,080 to Robert E. Smith, III, hydraulic flow may be radially between the members. Either configuration may be subject to ingress of debris. The debris may contaminate the hydraulic fluid or cause wear to the seals and sealing surfaces in hydraulic couplings and hydraulic systems.

U.S. Pat. No. 5,692,538 to Robert E. Smith, III describes an undersea hydraulic coupling member having angled flow ports to prevent ingress of debris into the hydraulic lines. The poppet valve in combination with the angled flow ports helps keep the hydraulic system clear of debris when the members are disconnected. The coupling of U.S. Pat. No. 5,692,538 includes a cylindrical passageway where the valve stem or actuator is positioned. Although the coupling of U.S. Pat. No. 5,692,538 can effectively prevent ingress of debris, it is desirable to increase the flow rate of hydraulic fluid through the coupling. Additionally, the poppet valve shown in U.S. Pat. No. 5,692,538 is opened in response to fluid pressure, rather than engagement of the valve actuator with the opposing valve actuator of the female member. Accordingly, it is desirable to provide an undersea hydraulic coupling with angled flow ports to prevent ingress of debris, but that also will have a higher flow rate through the coupling member, as well having a valve actuator configured to open the valve when mutually engaged with the female coupling member valve actuator.

SUMMARY OF THE INVENTION

The present invention resides in an undersea hydraulic coupling member having angled flow passages in the body section of the male member to help prevent ingress of debris. The valve actuator of the male member extends through the male member face. A port guard, which is a cylindrical member having a diameter greater than the diameter of the valve actuator, closes the angled flow ports when the poppet valve is in the closed position. Axial passages through the port guard allow passage of hydraulic fluid through the port guard when the valve is opened. The valve actuator extends through a bore in the probe of the male member, while the poppet valve body is located in the body section of the male member.

BRIEF DESCRIPTION OF THE DRAWINGS

The following drawings form part of the present specification and are included to further demonstrate certain aspects of the present invention. The invention may be better understood by reference to one or more of these drawings in combination with the detailed description of specific embodiments presented herein.

DETAILED DESCRIPTION OF THE PREFERRED EMBODIMENTS

The coupling of the present invention includes male member 10 as shown in

Figure 1:
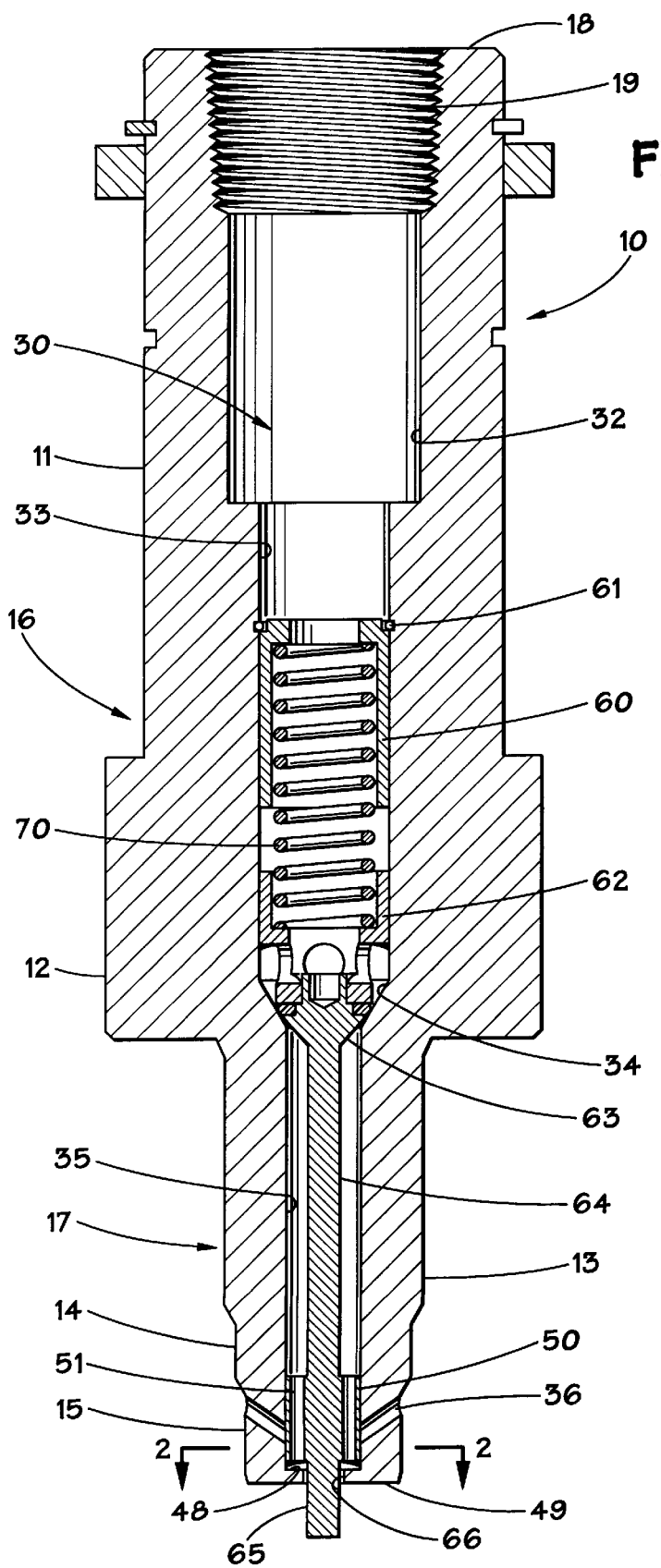
FIG. 1 is a section view of a male member of a coupling according to a preferred embodiment of the present invention.

FIG. 1, which typically faces upwardly from the subsea floor. The male member is commonly attached to one manifold plate, while the female member is attached to an opposing plate so as to face the male member and align with it. Male member 10 includes first end or leading face 49, and second end 18 for connection to a manifold plate or other securement means inside or outside a wellbore. The male member includes body section 16 having first diameter 11 and second diameter 12 which is larger than the first diameter. The male member also includes probe 17 having an outer diameter less than the body section of the male member. In a preferred embodiment, probe 17 has a stepped outer diameter including first probe section 13, second probe section 14, and third probe section 15. The probe terminates at leading face 49 at the first end of the male member.

Internal bore 30 extends through the male member, having a threaded bore section 19 for connection to hydraulic lines, a first section 32, a valve bore 33 having a smaller diameter than the first section, a valve actuator bore 35 having a smaller diameter than the valve bore, and the smallest bore 66 extending through the face of the male member. Conical valve seat 34 is located between the valve bore 33 and the actuator bore 35. The valve seat is preferably a tapered shoulder. The male member includes poppet valve 62 having a generally cylindrical body with conical valve face 63 which seals with the valve seat 34. The poppet valve is urged into the closed position by helical valve spring 70. The valve spring is anchored by spring collar 60 which is held in place by snap ring or clip 61.

Extending from the apex of the conical valve face 63 is valve actuator 64. Preferably, valve actuator 64 has an outer diameter of 50% or less than the diameter of valve actuator bore 35. The diameter of the valve actuator is dimensioned to optimize flow rates of hydraulic fluid through the male member of the hydraulic coupling. According to the present invention, the poppet valve is positioned in the body section, rather than the probe section of the male member. By positioning the poppet valve in the body section, the outer dimensions and weight of the coupling member can be reduced, without decreasing the flow rate of hydraulic fluid through the coupling. Accordingly, the present invention is most advantageously used in undersea hydraulic couplings wherein reduced size and enhanced flow rates are desired.

Figure 2:
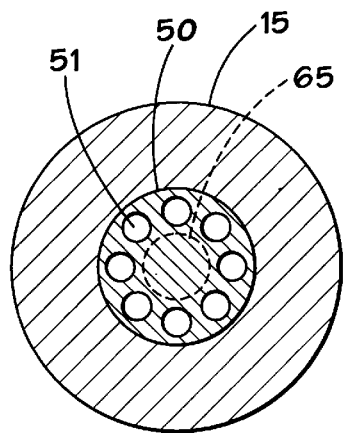
FIG. 2 is a section view along line A—A of FIG. 1.

Attached to the actuator 64 of the male member poppet valve is port guard 50. Port guard 50 preferably is a cylindrical body having an outer diameter slightly smaller than the diameter of actuator bore 35. The port guard may be a portion of the actuator having a greater diameter, preferably at least twice the diameter, of the remaining portion of the actuator. Thus, the port guard has a sliding interfit within the actuator bore. Although it is preferred that the port guard is integral with the actuator 64, it may be, alternatively, affixed to the actuator by other means. The port guard includes a plurality of axial flow ports 51 extending there through. In a preferred embodiment, as shown in FIG. 2, eight flow ports 51 are provided through the port guard 50. The port guard is dimensioned so that when the male member poppet valve is closed, port guard 50 is adjacent to the internal end 48 of the actuator bore 35. In the closed position, port guard 50 blocks fluid from entering the bore through the angled flow ports 36.

The angled passages are preferably 1/16 inch in diameter and are spaced at regular intervals around the circumference of the third probe section 15. The passages 36 are angled, as shown in FIG. 1, to prevent ingress of debris when the female member is disconnected and the male member remains subsea. The tip 65 of male member valve actuator 64 extends through bore section 66, so that the male member poppet valve may be urged opened through mechanical force, as will be described with reference to FIG. 3 and FIG. 4.

Figure 3:
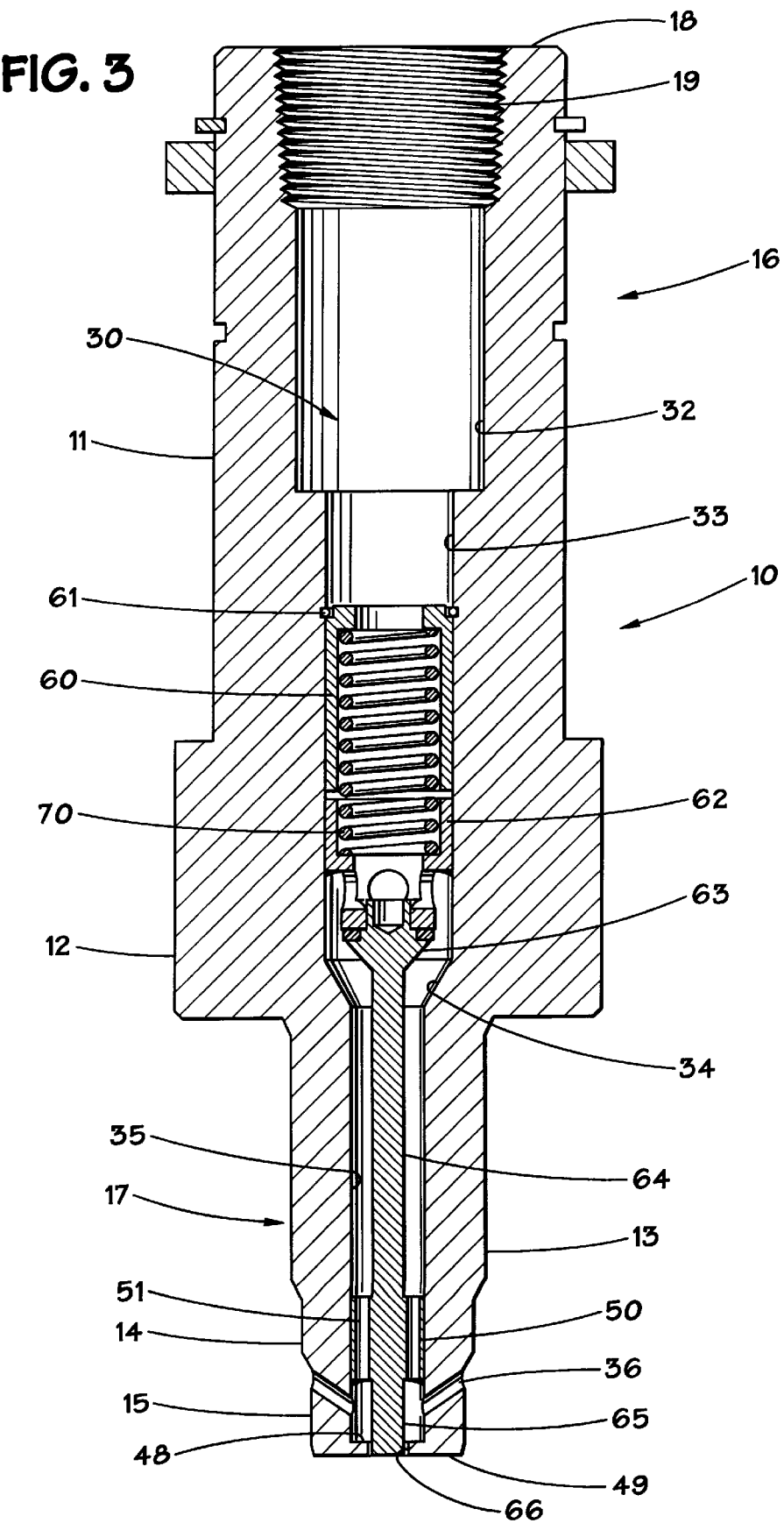
FIG. 3 is a section view of a male member of a coupling according to a preferred embodiment of the present invention, with the poppet valve in the open position.

FIG. 3 shows the male member of the coupling according to a preferred embodiment, with the male member poppet valve in the open position. The male member poppet valve is opened by mutual engagement of the tip 65 of valve actuator 64 with the corresponding valve actuator of the female member. In the open position, conical valve 63 is displaced from valve seat 34 to allow flow of hydraulic fluid through the male member of the coupling. The port guard 50 attached to valve actuator 64, moves axially sufficiently to allow hydraulic fluid to flow between angled flow ports 36 and valve bore 35. This allows hydraulic fluid to enter the male coupling member through angled flow ports 36, through flow ports 51 in port guard 50, and through valve bore 35.

Figure 4:
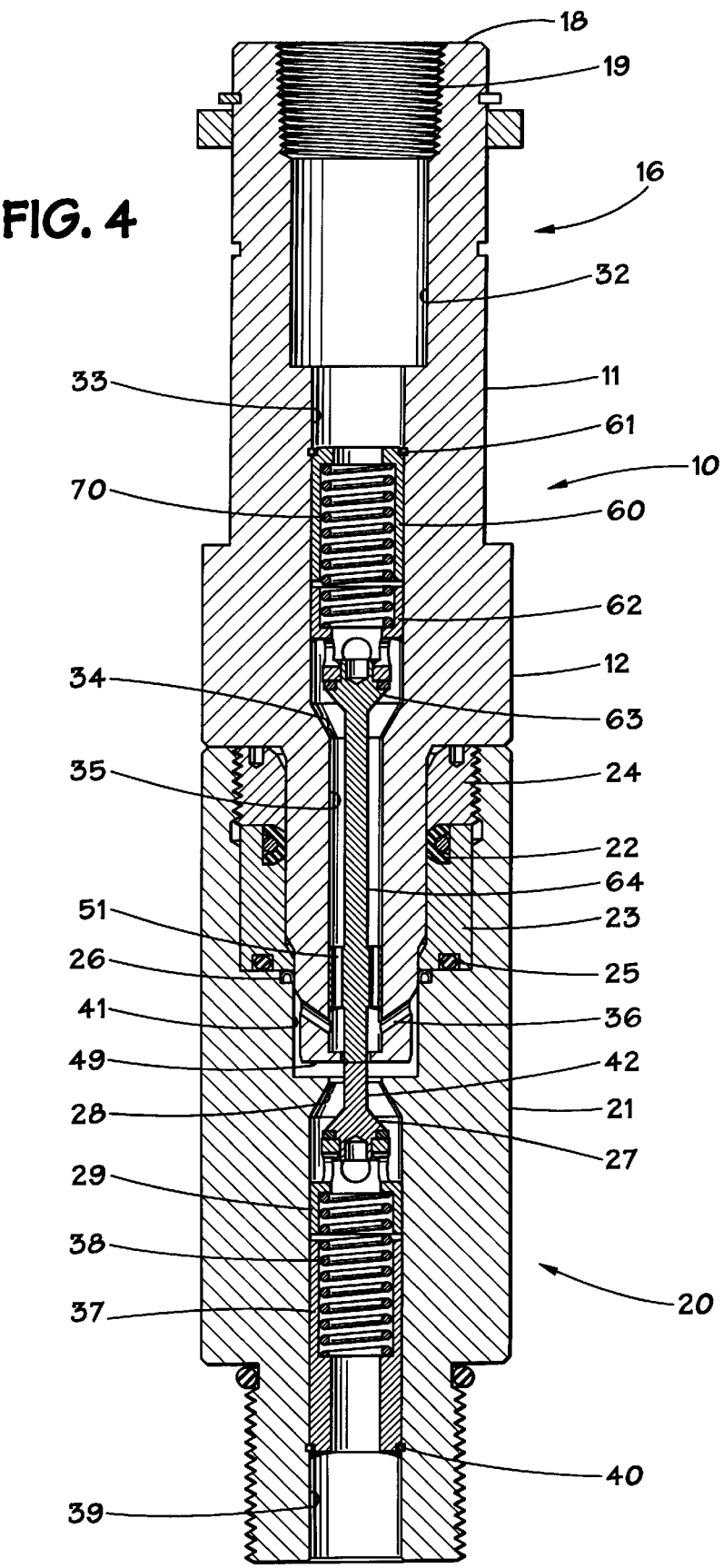
FIG. 4 is a section view of a male member of a coupling attached to a female member, according to a preferred embodiment of the present invention.

Now referring to FIG. 4, male member 10 of the coupling is shown connected to female member 20. The female member 20 includes body section 21 having a receiving chamber 41 which is dimensioned to receive probe 17 of the male member therein. The female member typically includes one or more seals in the receiving chamber for engagement with the probe section of the male member. As shown in FIG. 4, metal radial seal 26 is held in the receiving chamber by seal retainer 23 which is a sleeve-shaped member. The retainer may be locked in the female member by lock ring 24 which is threaded to the female member. An additional seal, preferably an elastomeric dovetail seal 22 may be included between the seal retainer and lock ring. Additionally, an O-ring seal 25 can be used to seal the junction between the seal retainer and the female member. The female member is provided with poppet valve 29 having conical valve face 27. In the closed position, the conical valve face seals against valve seat 28. Valve spring 38 urges the female poppet valve into the closed position. Spring collar 37 anchors the valve spring, and is held in place by snap ring or clip 40. The female member poppet valve slides within valve bore 39 in the female member. Extending from the apex of the conical valve face of the female member is valve actuator 42 which engages the corresponding valve actuator of the male member to urge the valves of both members into the open position.

As shown in FIG. 4, only the probe section of the male member enters the female member of the coupling. The body section of the male member, and the poppet valve of the male member, remain outside the receiving chamber of the female member. For this reason, the dimensions of the male and female coupling members may be reduced, and the weight of coupling members correspondingly reduced, without reducing the flow rate through the male and female coupling members.

Accordingly, the present invention provides an undersea hydraulic coupling having angled flow ports in the male member to prevent ingress of debris. An advantage of the present invention is that it closes the flow ports, with a port guard, when the poppet valves of the male member and female members are closed. Another advantage of the present invention is that it allows high flow rates in a smaller and lighter coupling.

Although variations in the embodiment of the present invention may not each realize all of the advantages of the invention, certain features may become more important than others in various applications of the device. The invention, accordingly, should be understood to be limited only by the scope of the appended claims.

What is claimed is:

1. An undersea hydraulic coupling member comprising:
   (a) a body section with a first internal bore extending therethrough, the body section attached to a probe, the probe having a second internal bore extending therethrough, the probe having a smaller outer diameter than the body section, the probe terminating at a leading face;

(b) a poppet valve slidable in the first internal bore between an open position and a closed position, the poppet valve having an actuator extending therefrom through the second internal bore;

(c) a plurality of flow ports extending between the second internal bore and the outer diameter of the probe; and (d) a port guard attached to the actuator, the port guard having a cylindrical body dimensioned to slide within the second internal bore, the port guard blocking fluid flow between the flow ports and the second internal bore when the poppet valve is in the closed position, the port guard having a plurality of axial passages for allowing fluid flow through the port guard when the poppet valve is in the open position.

2. The undersea hydraulic coupling of claim 1 wherein the flow ports are angled, each flow port having an outer end and an inner end, the outer end positioned above the inner end when the coupling member is positioned with the probe facing upward.

3. The undersea hydraulic coupling of claim 1 wherein the diameter of the second internal bore is at least twice the outer diameter of the actuator.

4. The undersea hydraulic coupling of claim 1 wherein the actuator extends through the leading face of the probe.

5. The undersea hydraulic coupling of claim 1 wherein the probe has a stepped external diameter with a smaller outer diameter adjacent the leading face.

6. An undersea hydraulic coupling member comprising:

(a) a body having a first end, a second end, a stepped outer diameter, a stepped internal bore extending therethrough, and a plurality of angled flow passages adjacent the first end, the angled flow passages extending through the body from the stepped internal bore to the stepped outer diameter;

(b) a valve slidable in the stepped internal bore for sealing fluid flow through the stepped internal bore when the valve is in the closed position, the valve having an actuator extending therefrom; and (c) at least a portion of the actuator having an outer diameter dimensioned to have a sliding interfit with the stepped internal bore sufficient to block fluid flow through the angled flow passages when the valve is in the closed position.

7. The undersea hydraulic coupling of claim 6 wherein the portion of the actuator having a sliding interfit has a plurality of axial passages therethrough.

8. The undersea hydraulic coupling of claim 6 wherein the valve is biased to the closed position, the actuator extending through the first end of the body when the valve is in the closed position.

9. An undersea hydraulic coupling member comprising:

(a) a probe having a leading face, a stepped outer diameter, a bore extending axially through the probe section, and a plurality of flow ports extending between the outer diameter and the bore;

(b) a valve actuator extending axially through the bore and through the leading face of the probe, the valve actuator movable between a first position and a second position, the valve actuator having a port guard, the port guard in the first position blocking fluid flow between the flow ports and the bore, and in the second position allowing fluid flow between the flow ports and the bore; and (c) a poppet valve attached to the valve actuator, the poppet valve slidable between a first position blocking fluid flow through the bore and a second position allowing fluid flow through the bore.

10. The undersea hydraulic coupling of claim 9 wherein the flow ports are angled.

11. The undersea hydraulic coupling of claim 9 further comprising a body section attached to the probe, the body section having a second bore therethrough, the poppet valve slidable in the second bore.

12. The undersea hydraulic coupling of claim 11 wherein the second bore has a greater diameter than the first bore.

13. The undersea hydraulic coupling of claim 9 wherein the port guard has a plurality of axial flow passages extending therethrough.

* * * * *